United States Patent [19]

Moll

[11] 4,442,983
[45] Apr. 17, 1984

[54] FISHING REEL WITH ADJUSTABLE DRUM BRAKE

[75] Inventor: Robert Moll, Chéserex, Switzerland

[73] Assignee: Etahlissement Liotte Rep. Etrangenes, Vaduz, Liechtenstein

[21] Appl. No.: 367,062

[22] Filed: Apr. 9, 1982

[30] Foreign Application Priority Data

Apr. 13, 1981 [CH] Switzerland ............... 2435/81

[51] Int. Cl.³ ............................................. A01K 89/02
[52] U.S. Cl. .................. 242/84.51 R; 242/99
[58] Field of Search ............... 242/84.5 R, 84.51 R, 242/99

[56] References Cited

U.S. PATENT DOCUMENTS

| 386,705 | 7/1888 | Graham | 242/84.51 R |
| 824,438 | 6/1906 | Richardson | 242/84.5 R |
| 2,550,271 | 4/1951 | Kagee | 242/84.51 R |
| 3,241,788 | 3/1966 | Visockis | 242/84.51 R |

*Primary Examiner*—Billy S. Taylor
*Attorney, Agent, or Firm*—Cushman, Darby & Cushman

[57] ABSTRACT

A reel for a fishing rod comprises a braking device consisting of a slider movable radially in relation to one of the cheeks of a drum on to which the line is wound, a flexible end of this slider exerting a braking effect which varies according to its radial distance. The cheek of the drum is preferably provided with radially orientated notches.

3 Claims, 2 Drawing Figures

FISHING REEL WITH ADJUSTABLE DRUM BRAKE

The present invention relates to a fishing reel with a rotary drum, and more particularly to such a reel comprising a support designed to be affixed to a fishing rod, a drum having two side cheeks and on to which the fishing line is wound and which is rotatably mounted on the support, and an adjustable brake device for the drum.

Adjustable brake devices are already known which act by friction on an integral part of the drum (U.S. Pat. No. 2,932,464). The brake effect obtained by such a device can be regulated by a pressure screw but, in practice, this method is only approximate and proves comparatively unstable.

An object of the invention is to provide a reel of which the drum can be braked in a manner which it is easy to adjust accurately and steplessly and in a manner directly visible.

According to the present invention, an adjustable brake device for the drum of a fishing reel comprises a slider movable radially in respect of the drum, said slider having a resilient end portion arranged to bear against the outer surface, substantially flat, of one of the cheeks of the drum, in such a manner as to exert a braking efffect by frictional force on the said cheek, the braking effect varying in accordance with the distance of the resilient end portion of the slider from the axis of the drum.

Preferably said cheek interacting with the slider has projecting or recessed notches evenly distributed over an annular zone of the said outer surface of the cheek, each of these notches, oriented radially, having an elongate shape and a height or depth which increases continuously in the radial direction, towards the periphery of the said cheek. Further objects and advantages of the invention will become apparent from the following description in connection with the attached drawing.

The drawing shows, by way of an example, one constructional version of the reel fitted with a brake device according to the invention.

Figure 1:
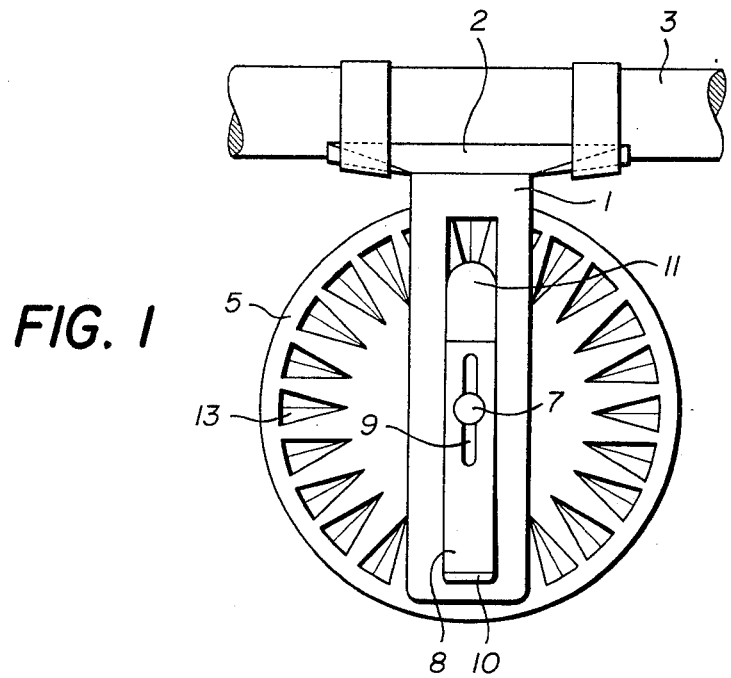
FIG. 1 is a schematic side view of the fishing reel.
Figure 2:
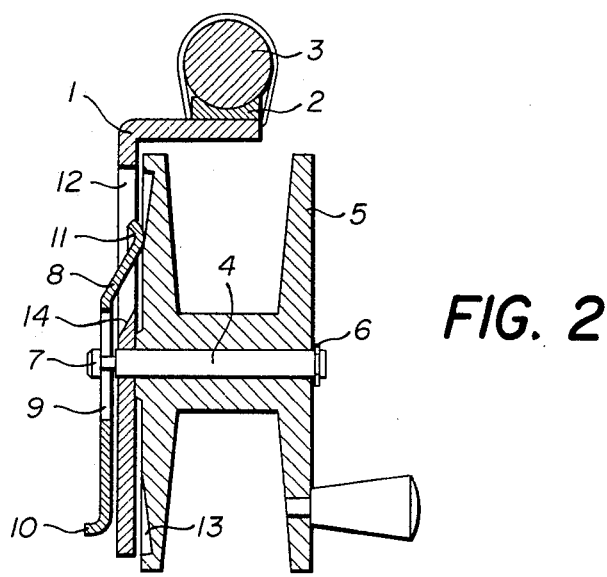
FIG. 2 is a cross section through the reel shown in FIG. 1.

The reel shown comprises a support 1 fitted with a device 2 enabling it to be affixed to a fishing rod 3. A shaft 4 is fixed to the support 1, while a drum 5 is arranged to rotate freely on the shaft. The drum 5 is secured in the axial direction by a stop 6 situated at one end of the shaft 4. The opposite end of this shaft is secured in the support and has a head 7 having a greater diameter than an adjacent portion of the shaft.

A slider 8, which consists, for example, of a spring blade, is provided near its centre with a rectangular aperture 9, which accomodates the portion of the shaft 4 which is of smaller diameter than the diameter of the head 7, this latter thus securing the slider 8 while, at the same time, enabling it to move perpendicularly to the shaft. For this purpose, one of the ends of the slider is provided with a protuberance 10 rendering it easier to actuate by hand. At the opposite end, a resilient end portion of the slider is shaped in such a way as to provide a projection 11 which, through an aperture 12 in the support 1, comes in contact with a cheek of the drum 5.

The cheek of the drum 5, which interacts with the projection 11, has notches 13 orientated radially and having a depth which increases from the central zone to the periphery of the drum. These notches are evenly distributed over an annular zone of the cheek of the drum on a level with the projection 11 movable in the direction of the drum's radius.

The aperture 12 is provided in the vicinity of the shaft 4 with a surface inclined in the direction in which the slider moves, so that the projection 11 rests against this surface in one extreme position and thus moves away from the cheek of the drum.

Depending on the position selected for the slider 8, the projection 11 is placed in a position opposite a corresponding portion of the annular zone of the cheek of the drum which is provided with notches, producing a braking effect which will be all the more intensive the greater the distance of the projection 11 from the shaft 4. This effect can be further intensified by the variable depth given to the notches as mentioned above, as well as by the variable width of these notches, as shown, for example, in FIG. 1. The notches may likewise take the form of projections and can be arranged in such a manner that there are more of them in the vicinity of the periphery of the drum than in a zone closer to its shaft. In another embodiment the surface of the cheek may be entirely flat but have a certain roughness and co-operate with the resilient end portion 11 by its frictional contact herewith to produce a braking effect. In all constructional versions, the braking force is progressively reduced by moving the projection 11 closer to the shaft, and the inner zone of the cheek can be completely smooth in order to obtain a very moderate braking effect, while the extreme position of the slider totally eliminates the contact between said end portion and the cheek and thus nullifies the braking effect.

I claim:

1. A fishing reel comprising a support designed to be affixed to a fishing rod, a drum having two side cheeks and on to which a fishing line is wound, means for rotatably mounting said drum on said support, and an adjustable brake device for said drum, said brake device comprising a slider lodged in a radial slot for radial adjustment with respect to said drum, said slider having a resilient end portion arranged to bear against a substantially flat outer surface of one of the cheeks of said drum, said cheek surface which interacts with the slider having a number of notches evenly distributed over an annular zone of the said outer surface of the cheek, each of these notches, oriented radially, having an elongated shape and a depth which increases continuously in the radial direction, towards the periphery of the said cheek so that a braking effect is exerted which varies in accordance with the distance of the resilient end portion of the slider from the axis of the drum.

2. A fishing reel in accordance with claim 1, comprising means for nullifying the contact between the resilient end portion of the slider and the durm, allowing to eliminate the braking action when desired.

3. A fishing reel in accordance with claim 2, wherein said means consists of a portion of the support close to the shaft of the drum and comprising an inclined surface against which the resilient end portion of the slider rests in its extreme position in the vicinity of the said axis of the drum.

* * * * *